US012698790B2

(12) United States Patent
Seo et al.

(10) Patent No.: US 12,698,790 B2
(45) Date of Patent: Aug. 4, 2026

(54) LIQUID FILLING METHOD, AND DEVICE FOR IMPLEMENTING THE SAME METHOD

(71) Applicant: ENDENTICS CO., LTD., Incheon (KR)

(72) Inventors: Ji Hwan Seo, Seoul (KR); Ho Young Kim, Seoul (KR); Won Jung Kim, Seoul (KR); Won Jun Shon, Seoul (KR)

(73) Assignee: ENDENTICS CO., LTD., Incheon (KR)

( * ) Notice: Subject to any disclaimer, the term of this patent is extended or adjusted under 35 U.S.C. 154(b) by 0 days.

(21) Appl. No.: 19/128,508

(22) PCT Filed: Nov. 8, 2023

(86) PCT No.: PCT/KR2023/017915
§ 371 (c)(1),
(2) Date: May 8, 2025

(87) PCT Pub. No.: WO2024/101899
PCT Pub. Date: May 16, 2024

(65) Prior Publication Data
US 2026/0201915 A1 Jul. 16, 2026

(30) Foreign Application Priority Data
Nov. 11, 2022 (KR) ........................ 10-2022-0150215

(51) Int. Cl.
*A61C 5/50* (2017.01)
*F15D 1/02* (2006.01)

(52) U.S. Cl.
CPC . *F15D 1/02* (2013.01); *A61C 5/50* (2017.02)

(58) Field of Classification Search
CPC ..................................... A61C 5/50; F15D 1/02
See application file for complete search history.

(56) References Cited

U.S. PATENT DOCUMENTS

2019/0021827 A1* 1/2019 Altshuler ........... A61C 17/0202
2022/0226199 A1* 7/2022 Saghiri .................... A61K 6/54

* cited by examiner

*Primary Examiner* — Jason K Niesz

(57) ABSTRACT

A method of filling a narrow channel having a closed end with liquid comprises: filling the channel with vaporized volatile substance; and filling the channel having been filled with the volatile substance in a gaseous state with injection liquid by applying pressure. In the step of filling the channel with the vaporized volatile substance, air existing inside the channel is discharged to outside of the channel. In the step of filling the channel with the injection liquid, a condensation of the volatile substance in the gaseous state and a phase change into a liquid state occur by the applied pressure, volume of the volatile substance is reduced, and a space inside the channel having been occupied by the volatile substance in the gaseous state is filled with the injection liquid.

8 Claims, 5 Drawing Sheets

FIG. 3

| material | vapor pressure (kPa, at 25 °C) |
|---|---|
| Methylene chloride, dichloromethane | 58 |
| Pentane | 58 |
| Butyric acid n | 48 |
| Carbon disulphide | 48 |
| Allyl chloride | 40 |
| Acetone | 30 |
| Methyl acetate | 28.8 |
| Bromine | 28 |
| Chloroform | 26 |
| Hexane | 17.6 |
| Methyl alcohol, methanol | 16.9 |
| Carbon tetrachloride | 15.3 |
| Benzene | 14 |
| Ethyl acetate | 14 |
| Ethyl alcohol | 12.4 |
| water | 2.4 |

LIQUID FILLING METHOD, AND DEVICE FOR IMPLEMENTING THE SAME METHOD

CROSS-REFERENCE TO RELATED APPLICATIONS

This application is the National Stage filing under 35 U.S.C. 371 of International Application No. PCT/KR2023/017915, filed on Nov. 8, 2023, which claims the benefit of Korean Patent Application No. 10-2022-0150215, filed on Nov. 11, 2022, the contents of which are incorporated by reference herein in their entirety.

TECHNICAL FIELD

The present invention relates to a liquid filling method, and more particularly to a method for filling a narrow channel or space having one closed end by injecting liquid therein, and to a device for implementing such a method.

BACKGROUND ART

The technology of filling a closed-end channel or space with liquid is being used in a variety of industries. However, if the air occupying the space to be filled with liquid is not removed or discharged to the outside in advance, the injection liquid cannot be filled sufficiently. Even if the air trapped inside is compressed, there is a problem that the injection liquid cannot fill the volume of the compressed air. Moreover, air trapped in a narrow channel or space with a closed end is more difficult to be discharged to the outside during the filling process of the injection liquid, unlike in the case of a wide space. In a narrow channel, the surface tension of the injection liquid has a strong effect, making it difficult for trapped air to penetrate the liquid and be discharged to the outside (see FIG. 1).

As far as the inventors of the present application understand, in order to fill a narrow channel or space with liquid by injecting it at one end, the following two methods have been attempted in the prior art. The first is a method of creating an outlet for air discharge in a blocked space and injecting the injection material while taking into account the loss of the injection material through the outlet for air discharge. This method not only causes material loss, but is also inapplicable in environments where the outlet of the space to be filled cannot be artificially formed. The second is to create a high level of vacuum in the space to be filled. However, it is ineffective in terms of a cost and process difficulty to create such a low pressure enough to remove the air inside. Additionally, when applying a realistically applicable vacuum, the air inside is not sufficiently removed. For example, even if the internal pressure is lowered to 0.1 atm, about 10% of the space is still occupied by air, so the space occupied by this air cannot be filled with the injection liquid (if air is assumed to be an ideal gas, the formula PV=mRT can be applied, where mass is proportional to pressure when temperature and volume are the same). Filling in a manner that creates a high vacuum is only applicable in limited situations where the vapor pressure of the injection liquid is extremely low or the target filling rate is low. When the vapor pressure of the injection liquid is relatively high, vaporization of the injection liquid is induced because the pressure inside the channel where a high vacuum is formed is lower than the vapor pressure of the injection liquid. To solve this problem, that is, the problem of causing vaporization of the injection liquid, if the vacuum level is limited to a level higher than the vapor pressure of the injection liquid, the problem of a low filling rate occurs. Therefore, filling in a manner that forms a high vacuum is effective only in limited situations where the vapor pressure of the injection liquid is extremely low or the target filling rate is low.

As discussed above, although the need for a technology capable of completely filling a narrow channel or space with one end blocked has existed in the related art, no effective solution has emerged until the present invention.

DETAILED DESCRIPTION OF INVENTION

Technical Objectives

An object of the present invention is to provide a method for filling a narrow channel or space with liquid by injecting the liquid into the channel or space having one end blocked, thereby achieving a significantly higher filling ratio than in the prior art, or a device for implementing such a method.

It is another object of the present invention to provide a method or a device for implementing such a method, which achieves a significantly higher filling ratio than the prior art while using significantly simpler equipment and reduced cost than the prior art.

Technical Solutions

The present invention relates to a method of filling a narrow channel having a closed end with liquid and a device for implementing the method. A method of filling a narrow channel having a closed end with liquid according to one embodiment of the present invention comprises the steps of: injecting a liquid volatile substance into the channel; sealing the channel and connecting a vacuum forming device; operating the vacuum forming device to form a negative pressure so that the pressure inside the channel becomes lower than the vapor pressure of the volatile substance, thereby vaporizing the liquid volatile substance; and filling the channel with the injection liquid by applying pressure.

In the vaporization step of the volatile substance in the liquid state, air existing inside the channel is discharged to the outside of the channel by the negative pressure applied by the vacuum forming device. In the filling step of the injection liquid, when the pressure applied inside the channel by the filling reaches a vapor pressure of the volatile substance, condensation of the volatile substance in a gaseous state occurs, reducing the volume of the volatile substance, and filling the space inside the channel having been occupied by the volatile substance in a gaseous state with the injection liquid.

In addition, the scope of the present invention encompasses a liquid filling device for implementing the liquid filling method described above.

In addition, additional configurations may be further included in the liquid filling method and the device for implementing such method according to the present invention.

Advantageous Effects

According to the present invention, a method for filling a narrow channel or space with liquid by injecting the liquid into the channel or space having one end blocked, thereby achieving a significantly higher filling ratio than in the prior art, or a device for implementing such a method can be provided.

Also, according to the present invention, a method or a device for implementing such a method, which achieves a significantly higher filling ratio than the prior art while using significantly simpler equipment and reduced cost than the prior art, can be provided.

BRIEF DESCRIPTION OF THE DRAWINGS

FIG. 3 is a table describing the vapor pressures of various substances at room temperature.

PREFERRED EMBODIMENTS

The detailed description of the invention that follows refers to the accompanying drawings that illustrate specific embodiments in which the invention may be practiced. These embodiments are described in sufficient detail to enable those skilled in the art to practice the invention. It should be understood that the various embodiments of the invention, while different from each other, are not necessarily mutually exclusive. For example, specific shapes, structures, and characteristics described herein may be modified and implemented from one embodiment to another without departing from the spirit and scope of the invention. It should also be understood that the positions or arrangements of individual components within each embodiment may be changed without departing from the spirit and scope of the present invention. Accordingly, the detailed description set forth below is not to be taken in a limiting sense, and the scope of the present invention should be accepted as encompassing the scope claimed in the patent claims and all scopes equivalent thereto.

Hereinafter, various preferred embodiments of the present invention will be described in detail with reference to the attached drawings so that a person skilled in the art to which the present invention pertains can easily practice the present invention.

Basic Principles of the Present Invention

In the present invention, the phenomenon of vaporization by boiling of a volatile liquid and condensation of vapor volatile substance by compression is utilized as a method for efficiently removing air inside a space to be filled. Typically, a gas occupies about 1000 times more volume than a liquid of the same weight. The filling target space is filled with vapor of a volatile liquid rather than air, and the injection liquid is filled. Immediately thereafter, by compressing the vapor of the volatile liquid and condensing it to induce a phase change into a liquid state, the volume is rapidly reduced, making it possible to secure a high filling rate.

Description of the Liquid Filling Method According to the Present Invention

Figure 1:
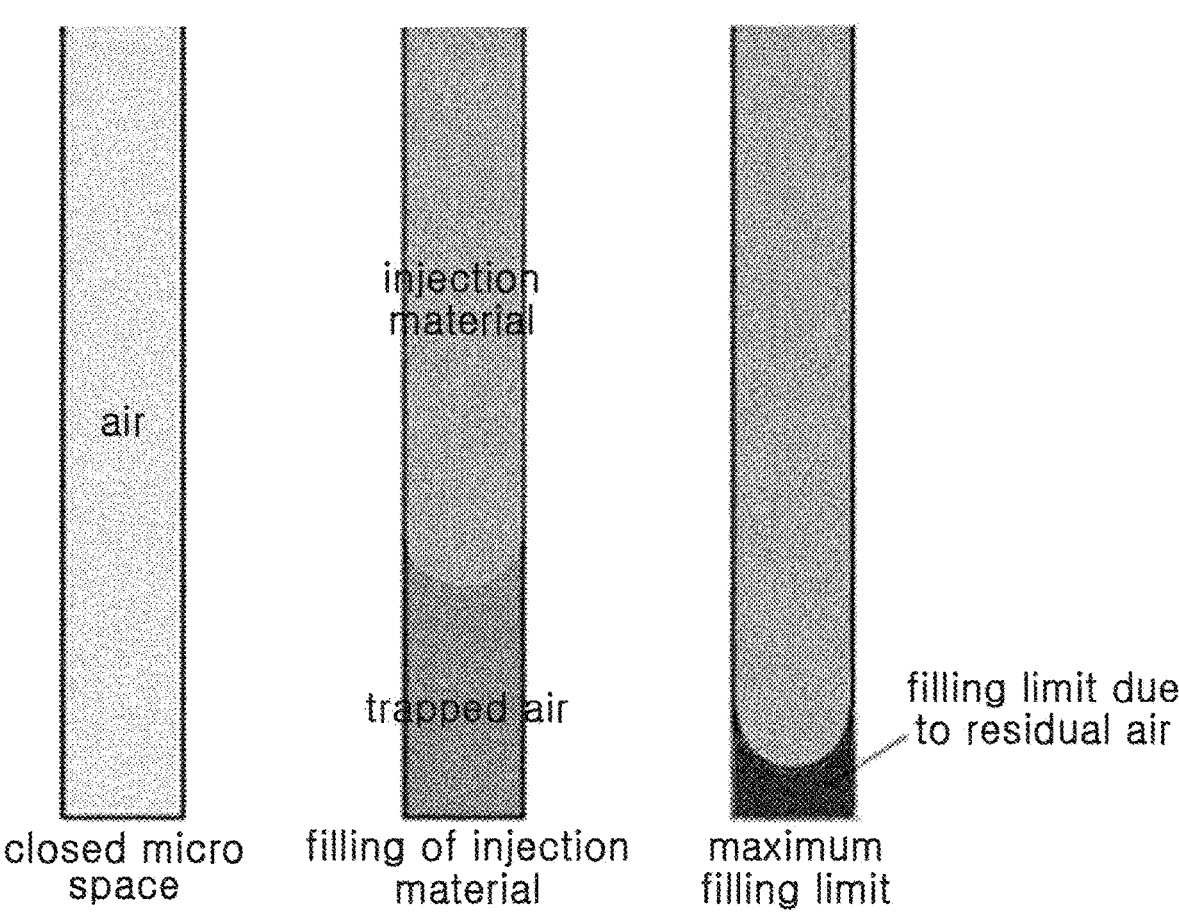
FIG. 1 is a drawing to explain why it is difficult to discharge the air trapped in a narrow channel or space with a closed end to the outside during the filling process of the injection liquid.
Figure 2:
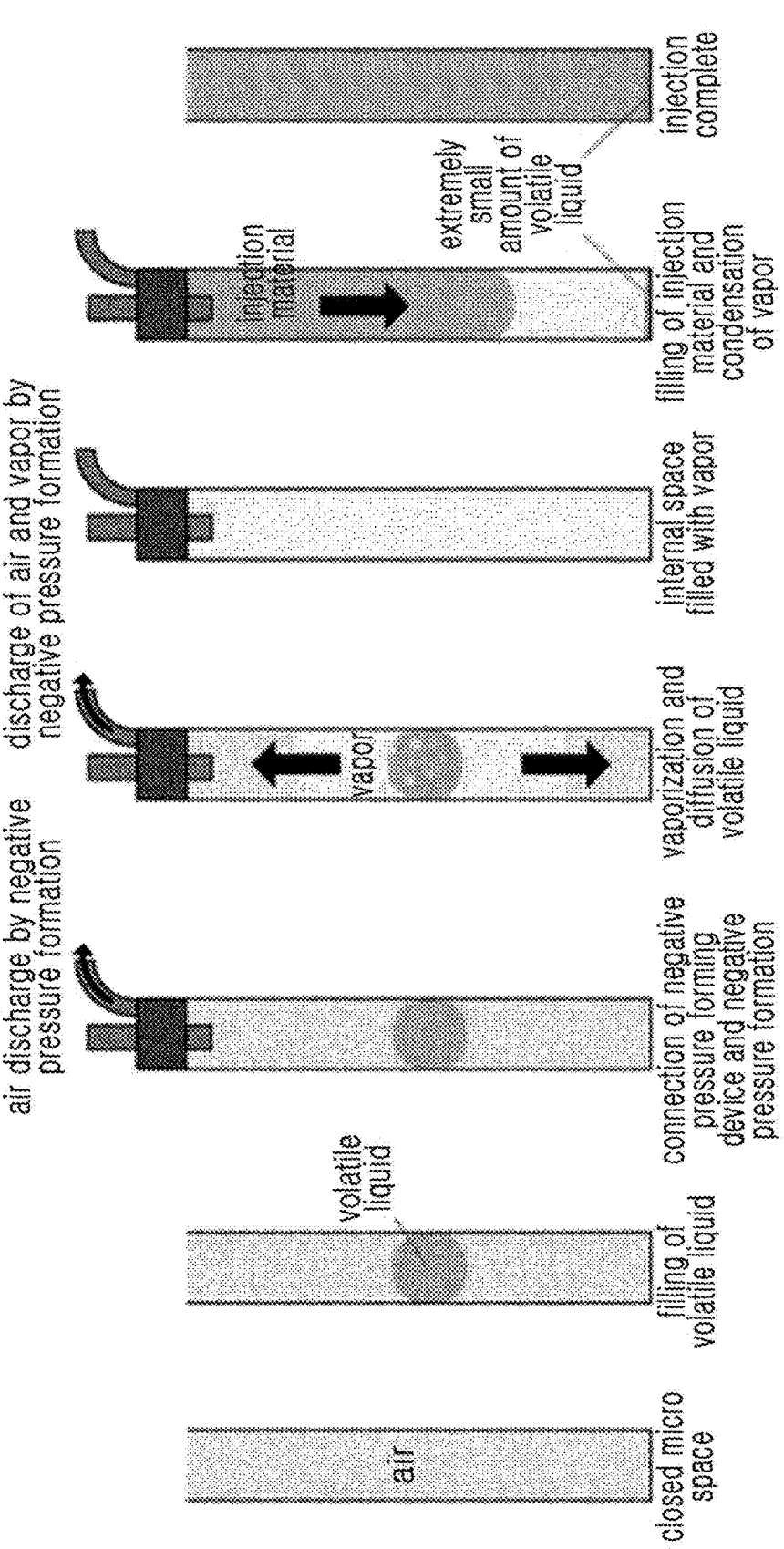
FIG. 2 is a drawing for explaining a liquid filling method according to one embodiment of the present invention.

FIG. 2 is a drawing for explaining a liquid filling method according to one embodiment of the present invention.

Hereinafter, a liquid filling method according to one embodiment of the present invention will be described with reference to FIG. 2.

In the first step, a volatile liquid is injected into the space to be filled.

In the second step, the space is sealed and a vacuum forming device is connected.

In the third step, a vacuum is formed so that a pressure below the vapor pressure of the volatile liquid at room temperature (or the temperature of the environment) is formed. Since the pressure only needs to drop below the vapor pressure, a high-level negative pressure forming device is unnecessary.

In the fourth step, some of the air that filled the space during negative pressure formation is discharged to the outside. This causes the pressure to drop, which causes the volatile liquid to boil and vaporize. By the operation of the vacuum forming device, some of the air and vapor (vapor generated by vaporization of the volatile liquid) inside are continuously discharged to the outside.

In the fifth step, when all the volatile liquid has vaporized during the negative pressure formation, most of the air occupying the space to be filled is discharged to the outside, and most of the space is filled with the vapor of the volatile liquid.

In the sixth step, the injection liquid is filled. As the injection liquid is filled, the vapor of the volatile liquid is compressed and the pressure in the internal space increases.

In the seventh step, when the pressure rises beyond the vapor pressure of the volatile liquid, condensation begins and a phase change occurs into a liquid with a volume of $\frac{1}{1000}$ of the volume of the vapor state.

In the eighth step, when the volatile liquid is completely condensed and the filling is finished, only about 0.1% of the total space is filled with the volatile liquid, and the remaining space is filled with the injection liquid.

Below, the theoretical background of the liquid filling method according to one embodiment of the present invention described above is specifically described.

First, the reason for utilizing a volatile liquid in the present invention will be explained. In order for a liquid substance to boil and vaporize, the pressure of the surrounding environment must drop below the vapor pressure, which is an inherent property of the substance, at a specific temperature, or the temperature of the surrounding environment must rise above the boiling point, which is an inherent property of the substance, at a specific pressure. When a liquid evaporates and becomes a gas, its volume generally increases by about 1,000 times. Conversely, when a gas liquefies and becomes a liquid, its volume decreases to $\frac{1}{1,000}$. Therefore, when the gas occupying the space to be filled is compressed and condensed, its volume is drastically reduced, allowing filling without empty space.

It is advantageous to use volatile liquids that can easily vaporize and liquefy at room temperature and near ambient pressure. Volatile liquids have relatively low vapor pressures, so they can be vaporized even when the pressure is slightly reduced at room temperature, and can be easily turned into vapor inside the target space. FIG. 3 is a table showing the vapor pressures of various substances at room temperature (for reference, 1 atm is approximately 100 kPa).

Next, the principle of internal air removal is explained. A volatile liquid is injected into the space to be filled, a negative pressure is formed, and vaporization occurs. Thereafter, the internal space can be filled with the vapor of the volatile liquid. Most of the air that previously filled the space is discharged to the outside during the initial negative pressure formation, and the remaining air can be continuously discharged along with some of the vapor generated by the vaporization of the volatile liquid. At this time, since the diffusion between the vapor of the volatile liquid and the air occurs quickly, the internal space can be filled with the vapor of the volatile liquid in a short period of time. In particular, when the internal pressure is low due to the formation of the negative pressure, the diffusion between gases proceeds more quickly.

For example, the typical gas-gas diffusion coefficient $D_{1atm}$ at 1 atm is:

$$D_{1atm} \sim 10^{-6} - 10^{-5} m^2/s$$

In an environment where a negative pressure is formed to vaporize a volatile liquid and a pressure of 0.1 atm is formed, the diffusion coefficient $D_{0.1atm}$ for an ideal gas increases by 10 times.

$$D_{0.1atm} \sim 10^{-5} - 10^{-4} m^2/s$$

If the depth of the filling space is L~10 mm, the time t required for vapor diffusion is within several seconds.

$$t \sim L^2/D_{0.1atm} \sim 10^0 - 10^1 s$$

Next, the appropriate negative pressure level is explained. Quantitatively, the target pressure (P) of the internal space must satisfy the following conditions. $P_{volatile\ liquid}$ is the vapor pressure of the volatile liquid at the ambient temperature.

$$P < P_{volatile\ liquid}$$

At this time, the type (and vapor pressure) of the volatile liquid and the target pressure of the internal space can be flexibly determined according to the vapor pressure characteristics of the injection liquid, the reactivity between the volatile liquid and the injection liquid, the suitability of the volatile liquid and the target filling space, and the ease of forming negative pressure for the target filling space. For example, if acetone is used as the volatile liquid, the boiling and vaporization of acetone is possible by lowering the pressure of the internal space to less than 0.3 atm.

Experiments Using Acetone as a Volatile Liquid

The inventor(s) of the present invention conducted an experiment to verify the performance of filling a liquid into a narrow channel or space with one end blocked by the method according to the present invention described above. In this experiment, acetone was adopted as a volatile liquid. Acetone has a vapor pressure of 30 kPa at 25° C. The vapor pressure at 36° C. is 48 kPa.

The inventor(s) of the present invention conducted a filling experiment for a total of three environments. In the first experiment, a model made of transparent acrylic was used so that the acetone vaporization process and the filling process could be observed from the outside. In the second experiment, a plaster model made in the shape of a tooth was used. In the third experiment, an actual extracted tooth was used.

In all three experiments above, liquid acetone was injected into the root canal of an acrylic channel or a plaster dental model or an actual extracted tooth. After that, the vaporization of acetone was induced by negative pressure formation, and the inside of the narrow channel with the closed end was filled with acetone vapor. After that, the filling material was injected, and the filling was completed by inducing a phase change of the vaporized acetone into a liquid state by the increasing pressure during the filling material injection.

Figure 4:
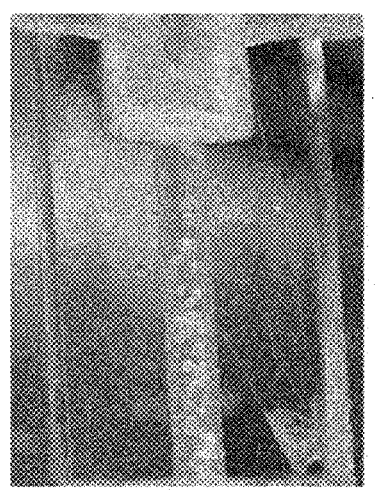
FIG. 4 is a diagram showing the results of an acetone vaporization experiment.
Figure 4:
Figure 4:
Figure 5:
FIG. 5 is a drawing showing the results of an injection experiment of a filling material in a vaporized state of acetone.
Figure 5:
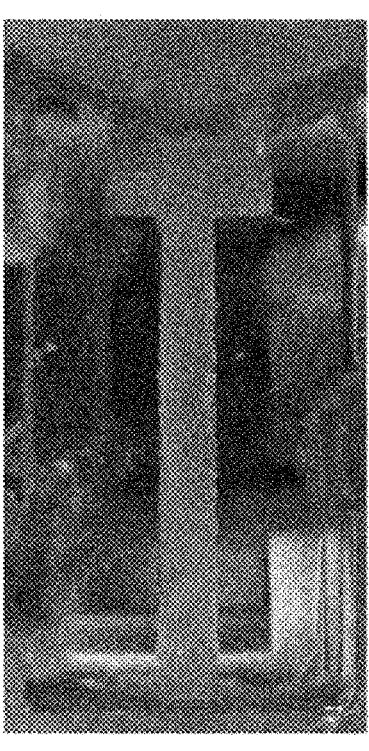
Figure 5:
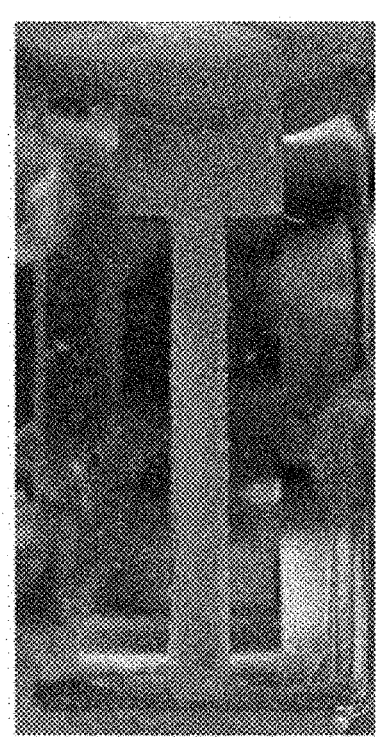

The experiment using the first acrylic model was conducted largely in two stages. The first stage was an experiment on the vaporization of acetone, and the second stage was an experiment on injecting the filling material in the vaporized state of acetone. In the acetone vaporization experiment, the inventor(s) formed a negative pressure in a water bath at 35 to 45° C. The negative pressure level was gradually increased between 0 and 90 kPa, and direct inhalation of liquid acetone was prevented during the negative pressure increase. FIG. 4 is a drawing showing the results of an acetone vaporization experiment. The left photo of FIG. 4 shows the state 2 seconds after applying negative pressure to 40 µL of liquid acetone injected into a narrow, closed-end channel. It can be seen that the acetone begins to vaporize in the form of small droplets. The middle photo of FIG. 4 shows the state 5 seconds after applying negative pressure. It can be seen that the vaporized acetone occupies a wider space. The right photo of FIG. 5 shows the state 10 seconds after applying negative pressure. It can be seen that the vaporized acetone occupies the entire narrow, closed-end channel. Through this experiment, it was confirmed that vaporization of acetone is possible by forming negative pressure, that air existing inside a channel can be almost completely discharged to the outside by forming negative pressure and that vaporized acetone can occupy the entire space, and that it takes about 10 seconds to vaporize 40 µL of acetone and completely occupy the space. In this experiment, 40 µL of acetone was used, and it was found that it took approximately 10 seconds to vaporize this amount of acetone. However, these experimental results should not be construed as limiting the scope of the present invention. The amount of used liquid acetone can be changed depending on the size of the space to be filled, and the time required to vaporize the liquid acetone can also vary depending on the environment in which the filling space is placed. In addition, any negative pressure forming method other than the negative pressure forming method used in this experiment can be applied. It is apparent that other types of volatile liquids other than acetone can be used.

The results of the injection experiment of the filling material are shown in FIG. 5. The left photo of FIG. 5 shows the state before the injection of the filling material where the acetone is completely vaporized and completely occupies the narrow channel with the end blocked. The middle photo of FIG. 5 shows the middle state during the process of injection of the filling material. Looking at the middle photo of FIG. 5, it can be seen that the opaque filling material has been injected and occupies more than ⅔ of the upper part of the channel, and the filling material has not yet reached the lower part of the channel. The photo on the right side of FIG. 5 shows that the filling material has almost completely reached the lower part of the narrow channel with the end closed, indicating that the filling is complete. Theoretically, there is acetone in a phase-changed liquid state, not a filling material, at the lowest part of the channel, but the space occupied by the liquid acetone is only ⅟₁₀₀₀ of the entire channel space, so it is visually confirmed that the filling material completely occupies the entire channel.

Figure 6:
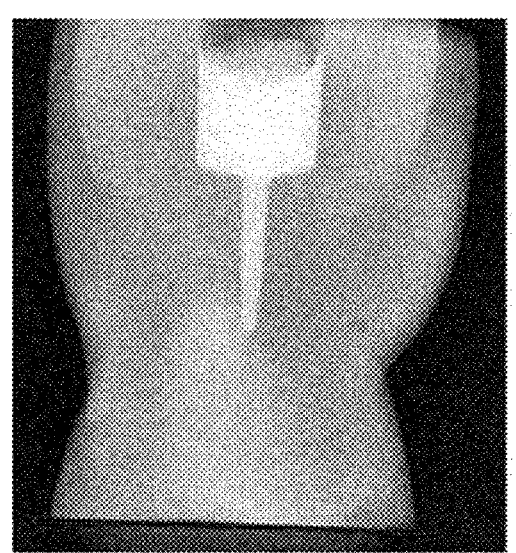
FIG. 6 is a drawing showing the results of a filling experiment using a plaster model made in the shape of a tooth.
Figure 6:
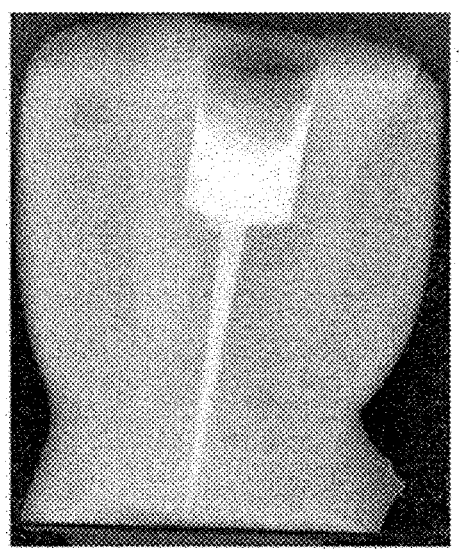

FIG. 6 is a drawing showing the results of a filling experiment using a plaster model made in the shape of a tooth. The inventor(s) used two control groups in the filling experiment using a plaster model of a tooth. The first is in a condition where a negative pressure is formed but acetone in a liquid state is not injected, and thus acetone vaporization is not caused. The left side of FIG. 6 shows the first control group. The second is in a condition where the filling material is injected while the same negative pressure is applied to vaporize the acetone after injecting the liquid acetone. The right side of FIG. 6 shows the second control group. In both control groups, the filling pressure was set to 150 kPa. As shown in FIG. 6, in the first control group, it can be seen that the channel formed in the plaster model of the teeth with an increasingly narrow shape was only half filled. On the other hand, in the second control group where the filling material was injected under the injection and vaporization of acetone, it can be seen that the channel of the same shape was completely filled. In the control groups shown in FIG. 6, the ends of the channels were completely sealed.

Figure 7:
FIG. 7 is a drawing showing the results of a filling experiment using an actual extracted tooth.
Figure 7:
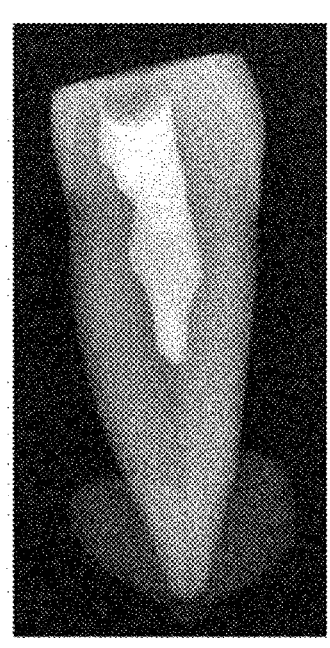
Figure 7:

FIG. 7 is a drawing showing the results of a filling experiment using an actual extracted tooth. The inventor(s) used a total of three control groups in this experiment. The first is in a condition where no negative pressure was applied and neither injection nor vaporization of acetone was applied. The left side of FIG. 7 shows the first control group. The second is in a condition where negative pressure was applied but neither injection nor vaporization of acetone was applied. The middle of FIG. 7 shows the second control group. The third is in a condition where acetone was injected and the filling material was injected while applying the same negative pressure as the second control group and vaporizing the acetone. The right side of FIG. 7 shows the third control group. The filling pressure was 150 kPa in all three control groups. Referring to FIG. 7, it can be confirmed that the control group to which the filling method according to the present invention was applied has an overwhelmingly superior filling performance.

Although the present invention has been described above with reference to specific details such as specific components and limited examples and drawings, these have been provided only to help a more general understanding of the present invention, and the present invention is not limited to the above examples, and those with common knowledge in the technical field to which the present invention pertains may make various modifications and changes based on this description.

Therefore, the idea of the present invention should not be limited to the embodiments described above, and not only the scope of the patent claims described below but also all scopes equivalent to or equivalently modified from the scope of the patent claims are included in the scope of the idea of the present invention.

The invention claimed is:

1. A method of filling a narrow channel having a closed end with liquid comprising;

filling the channel with vaporized volatile substance; and filling the channel having been filled with the volatile substance in a gaseous state with injection liquid by applying pressure, wherein in the step of filling the channel with the vaporized volatile substance, air existing inside the channel is discharged to outside of the channel, and wherein in the step of filling the channel with the injection liquid, a condensation of the volatile substance in the gaseous state and a phase change into a liquid state occur by the applied pressure, volume of the volatile substance is reduced, and a space inside the channel having been occupied by the volatile substance in the gaseous state is filled with the injection liquid.

2. The method according to claim 1, wherein the volatile substance is acetone.

3. A liquid filling device for implementing the method according to claim 1.

4. The liquid filling device according to claim 3, wherein the volatile substance is acetone.

5. A method of filling a root canal with a filling material comprising:

filling the root canal with vaporized volatile substance; and filling the root canal having been filled with the volatile substance in a gaseous state with the filling material by applying pressure, wherein in the step of filling the root canal with the vaporized volatile substance, air existing inside the root canal is discharged to outside of the root canal, and wherein in the step of filling the root canal with the filling material, a condensation of the volatile substance in the gaseous state and, a phase change into a liquid state occur by the applied pressure, volume of the volatile substance is reduced, and a space inside the root canal having been occupied by the volatile substance in the gaseous state is filled with the filling material.

6. The method according to claim 5, wherein the volatile substance is acetone.

7. A root canal filling device for implementing the method according to claim 5.

8. The root canal filling device according to claim 7, wherein the volatile substance is acetone.

* * * * *